March 14, 1944.  S. H. HOBSON  2,344,144
COOKING TOP BURNER FOR GAS RANGES
Filed Jan. 2, 1941  2 Sheets-Sheet 1
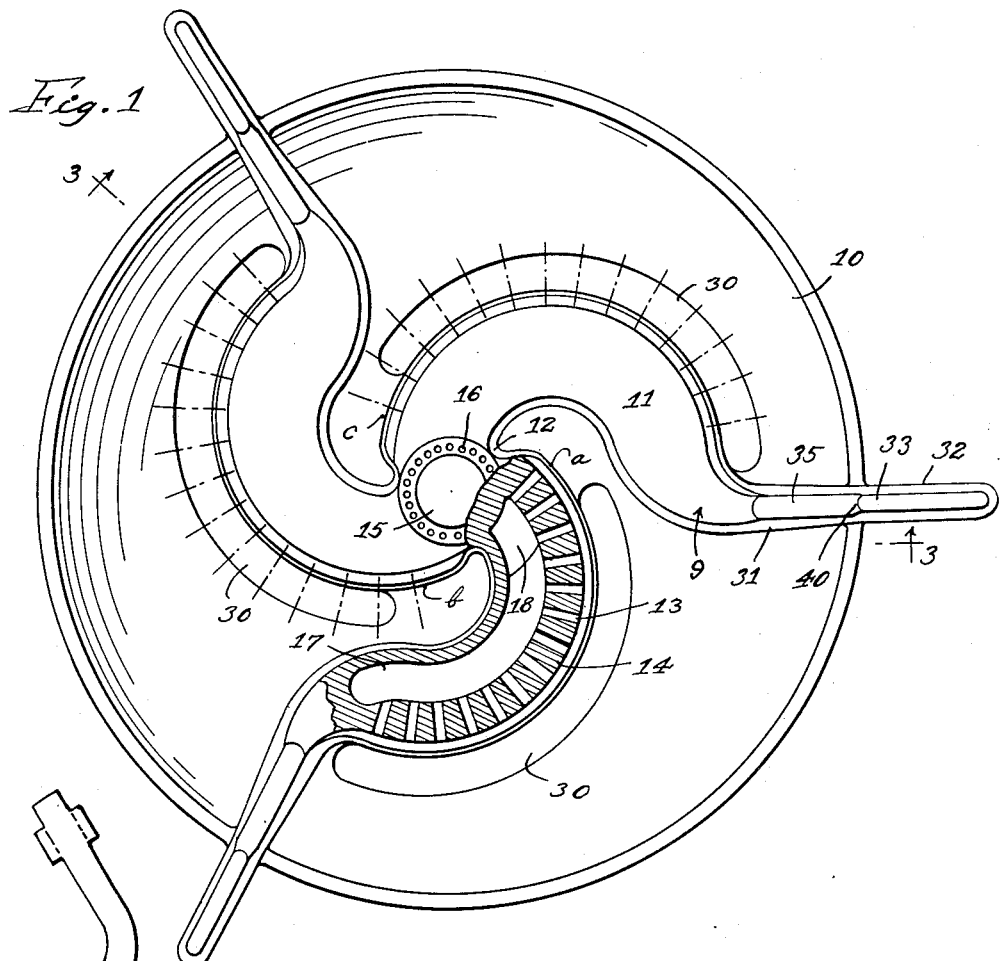
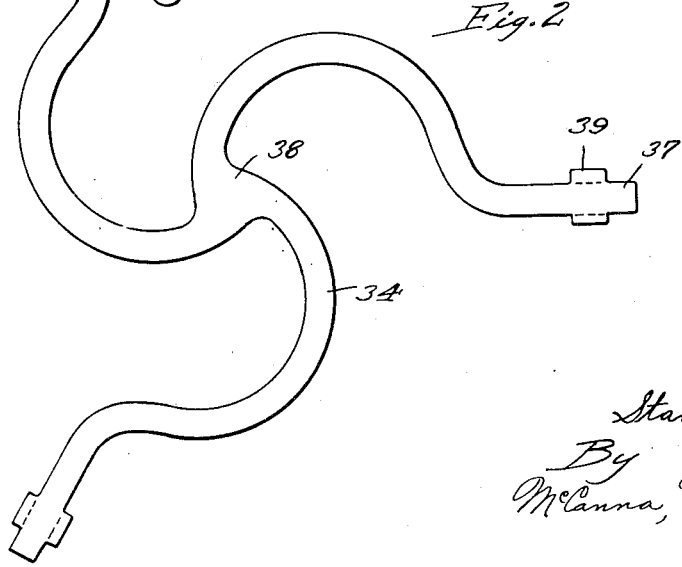
Inventor:
Stanley H. Hobson
By McCanna, Wintercorn & Morsbach
Attys.

March 14, 1944.   S. H. HOBSON   2,344,144
COOKING TOP BURNER FOR GAS RANGES
Filed Jan. 2, 1941   2 Sheets-Sheet 2
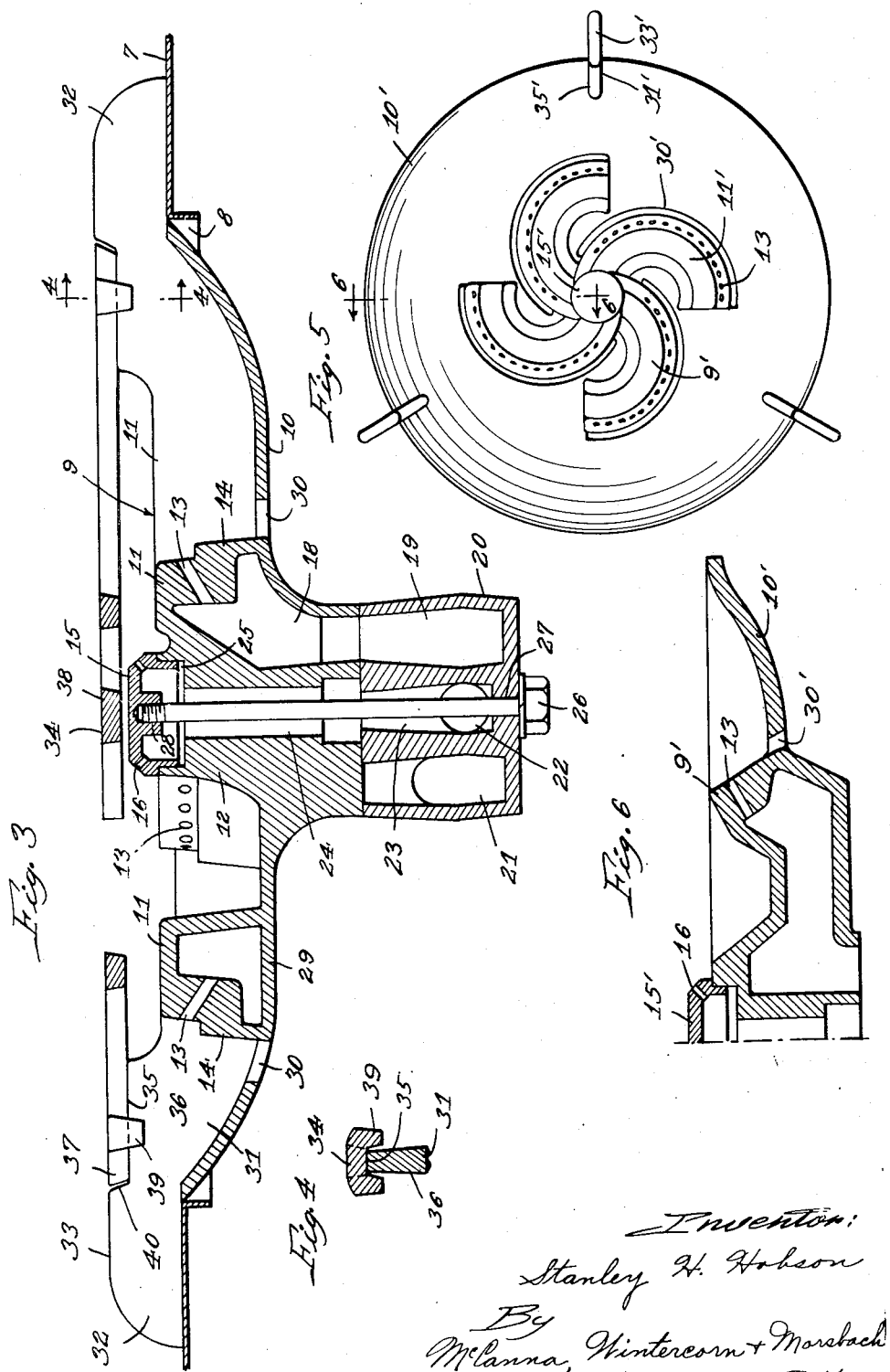
Inventor:
Stanley H. Hobson
By
McCanna, Wintercorn + Morsbach
Attys.

Patented Mar. 14, 1944

2,344,144

UNITED STATES PATENT OFFICE 2,344,144

COOKING TOP BURNER FOR GAS RANGES

Stanley H. Hobson, Rockford, Ill., assignor to Geo. D. Roper Corporation, Rockford, Ill., a corporatin of Illinois Application January 2, 1941, Serial No. 372,711

20 Claims. (Cl. 158—116)

This invention relates to a new and improved cooking top burner for gas ranges.

One of the principal objects of my invention is to provide a burner and burner supporting bowl as a single unit, preferably cast in one piece. The burner has spokes and these have ports in longitudinally spaced relation along one side thereof and the bowl is formed to provide slots alongside the spokes below the ports to insure adequate supply of secondary air to all of the flames to support combustion.

Another important object consists in the provision of a plural spoked form of burner which is not only integral with the burner bowl but has integral radial extensions on the ends of the spokes of the burner which rest on the cooking top for support of the unit and serve, moreover, as a part of a utensil supporting means. A separate removable utensil support of a plural spoked form similar in shape to the burner rests on the inner end portions of the extensions, flush with the top of the outer end portions of said extensions to support smaller sized utensils in vertically spaced relation over the burner.

Still another important object consists in the provision of a plural spoked burner having a simmer burner at the center thereof arranged to be operated alone or with the main burner and to serve as the lighter therefor, all of the spokes of the main burner having ports in longitudinally spaced relation along one side thereof and the ported sides of the several spokes being all in substantially tangential relation with the circle of the simmer burner, whereby to secure uniformly good lighting on all of the spokes.

Another object consists in the provision of a plural spoker burner, each of the spokes of which is of arcuate form, the centers therefor being in equally circumferentially spaced relation about the center of the burner from which the spokes radiate, thus defining the inner end portions of a plurality of spirals, so that when ports are provided in circumferentially spaced relation along the same side of each of the spokes, the resulting flame pattern insures substantially uniform heat distribution.

The invention is illustrated in the accompanying drawings, in which—

Figure 1 is a top plan view of a burner made in accordance with my invention, with the removable utensil support removed and showing one of the spokes and a portion of the simmer burner in section;

Fig. 2 is a top plan view of the removable utensil supporting spider;

Fig. 3 is a vertical section on the broken line 3—3 of Fig. 1 with the spider of Fig. 2 in place and showing also a small portion of the cooking top in section;

Fig. 4 is a sectional detail on the line 4—4 of Fig. 3;

Fig. 5 is a top plan view of another burner made in accordance with my invention, and Fig. 6 is a section on the line 6—6 of Fig. 5.

Similar reference numerals are applied to corresponding parts throughout these views.

Referring first to Figs. 1 to 4, the numeral 7 designates a portion of the cooking top of a gas range in which there are openings, like that shown at 8, for each of the cooking top burners. The numeral 9 designates one of the the cooking top burners which, in accordance with my invention, is cast integral with the cooperating burner bowl 10. The burner 9 is of three-spoked form, each of the spokes 11 being of arcuate form and extending spiralwise from a center hub 12. The centers for the arcs of the spokes are in uniformly circumferentially spaced relation around the hub 12. The ports 13 in each spoke are in uniformly circumferentially spaced relation along the thicker radially outer wall 14, the ports radiating from the centers, a, b, and c of the arcs of said spokes, as clearly indicated in Fig. 1, so that adjacent ports are in mutually divergent relation to one another and a smaller number of ports of larger size than could otherwise be employed safely may be provided without danger of the flames from adjacent ports merging into a single sheet of flame and thus prevent good aeration. The ports by virtue of their divergent relationship may also be provided in closer spaced relationship than would otherwise by practical, because the gas after discharge from the ports expands and the diverging direction of the streams allows for this expansion while at the same time permitting good access of secondary air to the individual streams. The closer spacing of the ports makes for good lighting and good flame communication on turn-down. A simmer burner 15 of annular form is provided in the upper end of the hub 12, and the radially outer walls 14 of the burner spokes 11 extend substantially in tangential relation with the periphery of this simmer burner. The ports 16 of the simmer burner are in equally circumferentially spaced relation around the periphery thereof and all radiate from the center and are hence in mutually divergent relationship. The flames from these ports extend radially outwardly far enough to easily light the gas discharging from the innermost port or ports 13 of the main burner 9. The spokes 11 of the main burner are hollow, as indicated at 17 in Fig. 1, the inner end of each spoke communicating through a passage 18 with the annular chamber 19 in the end of a gas supply fitting 20, which has two passages 21 and 22 leading from separate mixers communicating with individual discharge nipples of a dual gas supply cock in a manner well known in this art and common with double gas burners. The passage 21 communicates with the annular chamber 19 for delivery of gas simultaneously to the three spokes 11 of the main burner 9. The passage 22 communicates with a central chamber 23 in the fitting 20, which in turn, communicates with a central passage 24 in the hub 12, whereby to deliver gas to the simmer burner 15, the latter being mounted in a counterbore 25 in the upper end of the hub 12 concentric with the passage 24. A bolt 26 extends through a center hole 27 in the fitting 20 upwardly through the fitting 20 and into the hub 12 and is threaded in a center hole 28 in the simmer burner 15, whereby to clamp the fitting 20 onto the hub 12 and at the same time draw the simmer burner down tightly onto the hub 12. The fitting 20 with this construction is also adjustable rotatively with respect to the burners 9 and 15 about the hub 12 as a center. Another advantage of this construction is the fact that the same burners can be used for the front or rear of the cooking top, short mixers with fittings 20 on the end thereof serving for the front burners and longer mixers with fittings 20 on the ends thereof being used for the rear burners, extending from the two-way gas supply cocks at the front of the burner box compartment to the related burners.

The burner bowl 10 is of circular form to fit the circular opening 8, although, of course, other shaped bowls may be provided if desired when other shaped openings are provided in the cooking top. The bowl 10 is concentric with the hub 12 and, hence, with the main burner 9 and simmer burner 15. The bowl is preferably cast integral with the bottom wall 29 of the burner 9 and has arcuate slots 30 provided therein along the radially outer periphery of the spokes 11, so that there is easy access to the ports 13 for secondary air to support combustion. These slots also serve to drain any liquid from the bowl in the event of a utensil boiling over, the usual drip pan in the bottom of the burner box compartment serving to catch what drops from the burners. I may provide the bowl 10 integral with the lower edge portions of the burner 9 and provide a separate bottom plate in lieu of the bottom wall 29 to simplify production of the burners, or, if desired, the bowl may be made integral with a bottom plate for the burner 9.

The spokes 11 of the burner 9 have integral radial extensions 31, the outer portions 32 of which project beyond the periphery of the bowl 10 and are adapted to rest on the cooking top 7 to support the bowl and burner in the opening 8. The top surfaces 33 of the outer end portions 32 are all in a common horizontal plane at a predetermined elevation above the cooking top 7 and also at a certain elevation above the burners 9 and 15 and at approximately the same radius with respect to the burners 9 and 15 to serve as part of the utensil supporting means. A separate removable utensil support 34 of three-spoked form, following the general contour of the burner 9 and its radial extensions 31, is adapted to rest on the depressed top surface 35 of the inner end portions 36 of the extensions 31, with the top surface of the support 34 substantially flush with the top surfaces 33 as indicated in Fig. 3. The outer end portions 37 of the utensil support 34 extend radially with respect to the center hub portion 38 of said support and have downwardly projecting lugs 39 on the opposite sides thereof to straddle the radial extensions 31 so as to hold the utensil support against rotary displacement with respect to the burner 9. The center hub portion 38 of the utensil support 34 is disposed over the center of the simmer burner 15, as indicated in Fig. 3, and radial displacement of the utensil support with respect to the burners 9 and 15 is prevented partly by the lugs 39 and partly by the fact that the utensil support 34 rests on the depressed surfaces 35 and will accordingly come into contact with the shoulders 40 in the event of any slight radial movement. The utensil support 34 will provide steady support for smaller utensils, the bottoms of which are not large enough in diameter to rest on the top surfaces 33 of the outer end portions 32 of the radial extensions 31. In any event, it is clear that there is always good egress for products of combustion from the burners 9 and 15.

The burner 9' shown in Figs. 5 and 6 is of four-spoked construction integral with a bowl 10' and equipped with a simmer burner 15'. Each of the spokes 11' of the burner 9' has radial ports 13, similarly as in the case of the burner 9, and the simmer burner 15' has radial ports 16, similarly as in the case of the burner 15. The bowl 10' is slotted arcuately, as indicated at 30', similarly as in the case of the other burner bowl. At 31' are indicated lugs integral with the bowl 10' providing supports for the burner on the cooking top, similarly as in the case of the extensions 31, and these lugs preferably provide utensil supporting surfaces 33' at a level above the cooking top, similarly as the surfaces 33, the surfaces 35' being at a lower elevation, like the surface 35, to provide support for a separate removable utensil support (not shown), the top surface of which is substantially flush with the surface 33', similarly as in the case of the utensil support 34.

In the operation of both burners 9 and 9', it is obvious that the flame pattern obtained with the plurality of spokes extending spiralwise will make for much more uniform heat distribution than is obtainable with most other shapes of burners, and there is, moreover, less danger of fouling due to the fact that the slots 30 and 30' provide easy access of secondary air to all of the burner ports and also due to the fact that the utensil supporting means permits easy egress of products of combustion from the burners between the bottom of the utensil and the cooking top, whether the utensil be small or large. With the present construction, the fact that the burner is in rigid relation to its bowl and also in rigid relation to the utensil supporting means eliminates many of the difficulties arising otherwise, due to the burner becoming cocked at an acute angle relative to the bowl and utensil support becoming cocked one way or another relative to the burner. There is also eliminated the problem of reassembling the burner bowl and utensil support in the correct relationship to one another after the housewife has cleaned the same, much of the unsatisfactory operation of cooking ranges being traceable to the housewife being unable to get the parts replaced correctly.

It is believed the foregoing description conveys a good understanding of the objects and advantages of my invention. The appended claims have been drawn to cover all legitimate modifications and adaptations.

I claim:

1. A gas burner, comprising a central hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship.

2. In combination, a gas burner comprising a hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, and a burner bowl rigid with said burner and having the bottom thereof below the plane of the ports in said burner, said bowl having arcuate secondary air supply slots provided therein substantially concentric with the arcuate spokes of the burner and adjacent the radially outer ported side walls thereof.

3. In combination, a gas burner comprising a hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, a burner bowl rigid with said burner and having the bottom thereof below the plane of the ports in said burner, said bowl having secondary air supply openings provided therein adjacent the radially outer ported side walls, and outwardly reaching projections on the periphery of said bowl in a plane substantially parallel to the plane of the burner for supporting the burner and bowl.

4. In combination, a gas burner comprising a hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, a burner bowl rigid with said burner and having the bottom thereof below the plane of the ports in said burner, said bowl having secondary air supply openings provided therein adjacent the radially outer ported side walls, and outwardly reaching projections on the outer ends of the spokes of said burner projecting beyond the periphery of said bowl in a plane substantially parallel to the plane of said burner for support of the burner and bowl.

5. A structure as set forth in claim 3, including a utensil support detachably mounted on said projections, said projections having the outer portions thereof with their top surfaces in a common horizontal plane substantially flush with the top surface of the utensil support.

6. A structure as set forth in claim 4, including a utensil support detachably mounted on said projections, said projections having the outer portions thereof with their top surfaces in a common horizontal plane substantially flush with the top surface of the utensil support.

7. In combination, a gas burner comprising a central hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, a circular lighting and simmer burner of small diameter in relation to the rest of said structure on top of the hollow hub portion in substantially concentric relation thereto, said circular burner having radial ports in circumferentially spaced relation, the radially outer side walls of the spoke portions having their inner end portions disposed in substantially tangential relation with the circular burner and so that the innermost ports on said spokes are in lighting proximity with the ports of the circular burner, and means for supplying gaseous fuel to said burners.

8. In combination, a gas burner comprising a central hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, and means for supporting the burner, comprising extensions on the outer ends of three of the burner spokes in circumferentially spaced relation relative to the burner and disposed in a common plane substantially parallel with the plane of the burner.

9. In combination, a gas burner comprising a central hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, a circular lighting and simmer burner of small diameter in relation to the rest of said structure on top of the hollow hub portion in substantially concentric relation thereto, said circular burner having radial ports in circumferentially spaced relation, the radially outer side walls of the spoke portions having their inner end portions disposed in substantially tangential relation with the circular burner and so that the innermost ports on said spokes are in lighting proximity with the ports of the circular burner, means for supplying gaseous fuel to said burners, and means for supporting said burners comprising extensions on the outer ends of three of the burner spokes in circumferentially spaced relation relative to the burner and disposed in a common plane substantially parallel with the plane of the burner.

10. A burner structure as set forth in claim 14, including a burner bowl integral with the spokes and extensions and having the bottom wall thereof below the plane of the ports in said spokes, said bowl having secondary air inlet slots provided therein extending arcuately along the radially outer side walls of the spokes in close relation to the ports thereof.

11. A burner structure as set forth in claim 15, including a burner bowl integral with the spokes and extensions and having the bottom wall thereof below the plane of the ports in said spokes, said bowl having secondary air inlet slots provided therein extending arcuately along the radially outer side walls of the spokes in close relation to the ports thereof.

12. In combination, a gas burner comprising a hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, and a burner bowl rigid with said burner and having the bottom thereof below the plane of the ports in said burner, said bowl having secondary air supply openings provided therein adjacent the radially outer ported side walls thereof.

13. A gas burner, comprising a central hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, and outwardly reaching projections on the outer ends of the spokes of said burner in a plane substantially parallel to the plane of said burner for support thereof on a burner support.

14. A gas burner as set forth in claim 13, including a utensil support detachably mounted on said projections, said projections having the outer portions thereof with their top surfaces in a common horizontal plane substantially flush with the top surface of the utensil support.

15. In combination, a gas burner comprising a central hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, a circular lighting and simmer burner of small diameter in relation to the rest of said structure on top of the hollow hub portion in substantially concentric relation thereto, said circular burner having radial ports in circumferentially spaced relation, the radially outer side walls of the spoke portions having their inner end portions disposed in substantially tangential relation with the circular burner and so that the innermost ports on said spokes are in lighting proximity with the ports of the circular burner, means for supplying gaseous fuel to said burners, and a burner bowl rigid with the spoke portions of said first-mentioned burner and having the bottom thereof below the plane of the ports in said spokes, said bowl having secondary air supply openings provided therein adjacent the radially outer ported side walls of said spokes, said openings being adapted to supply secondary air also to the ports of the lighting and simmer burner.

16. In combination, a gas burner comprising a central hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, a lighting and simmer burner of small dimensions in relation to the rest of said structure on the hollow hub portion having ports in circumferentially spaced relation and arranged in lighting proximity with the innermost ports on the aforesaid spokes, and means for supplying gaseous fuel to said burners.

17. A burner structure as set forth in claim 16, including a burner bowl integral with the spokes of the first-mentioned burner and having the bottom wall thereof below the plane of the ports in said spokes, and provided with secondary air inlet openings in close relation to the ports, said openings being in sufficiently close relation to the ports of the lighting and simmer burner to supply secondary air thereto also.

18. A burner structure as set forth in claim 16, including a burner bowl integral with the spokes of the first-mentioned burner and having the bottom wall thereof below the plane of the ports in said spokes, and provided with secondary air inlet openings in close relation to the ports, said openings being in sufficiently close relation to the ports of the lighting and simmer burner to supply secondary air thereto also, the means for supplying gaseous fuel to said burners comprising a downward extension of the central hollow hub portion below the bowl, and a mixer fitting for conducting combustible mixtures of gas and air to said burners attached to the lower end of said hub extension.

19. In combination, a gas burner comprising a central hollow hub portion and a plurality of hollow arcuate spoke portions connected at one end to the hub in circumferentially spaced relation with respect thereto and extending outwardly from the hub spiralwise, all in a common plane substantially normal to the hub portion, each of the spoke portions having ports in circumferentially spaced relation in the radially outer side wall thereof on lines radiating from the centers of the arcs of said spokes, whereby all of the ports in each of said spokes are in mutually divergent relationship, a circular lighting and simmer burner of small diameter in relation to the rest of said structure on top of the hollow hub portion in substantially concentric relation thereto, said circular burner having radial ports in circumferentially spaced relation, the radially outer side walls of the spoke portions having their inner end portions disposed in substantially tangential relation with the circular burner and so that the innermost ports on said spokes are in lighting proximity with the ports of the circular burner, and means for supplying gaseous fuel to said burners.

20. A burner structure as set forth in claim 19, including a burner bowl integral with the spokes and having the bottom wall thereof below the plane of the ports in said spokes, said bowl having secondary air inlet openings provided therein adjacent the radially outer ported side walls of the burner.

STANLEY H. HOBSON.